(12) United States Patent
Nishida

(10) Patent No.: US 10,705,206 B2
(45) Date of Patent: Jul. 7, 2020

(54) ESTIMATION DEVICE, ESTIMATION METHOD, TRACKING DEVICE INCLUDING ESTIMATION DEVICE, AND TRACKING METHOD INCLUDING ESTIMATION METHOD

(71) Applicant: Mitsubishi Electric Corporation, Tokyo (JP)

(72) Inventor: Takaaki Nishida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 201 days.

(21) Appl. No.: 15/636,935

(22) Filed: Jun. 29, 2017

(65) Prior Publication Data

US 2018/0239015 A1 Aug. 23, 2018

(30) Foreign Application Priority Data

Feb. 23, 2017 (JP) .................................. 2017-031868

(51) Int. Cl.
*B62D 15/02* (2006.01)
*G01S 13/90* (2006.01)
(Continued)

(52) U.S. Cl.
CPC ........ *G01S 13/9029* (2013.01); *B62D 15/025* (2013.01); *G01S 13/584* (2013.01);
(Continued)

(58) Field of Classification Search
CPC ....... B62D 15/025; G01S 13/34; G01S 13/44; G01S 13/584; G01S 13/726;
(Continued)

(56) References Cited

U.S. PATENT DOCUMENTS

2004/0111200 A1 6/2004 Rao et al.

FOREIGN PATENT DOCUMENTS

| JP | 2007004711 A | 1/2007 |
| JP | 2007-200074 A | 8/2007 |

(Continued)

OTHER PUBLICATIONS

Communication dated Jan. 9, 2018 from the Japanese Patent Office in counterpart Japanese application No. 2017-031868.

(Continued)

*Primary Examiner* — Jerrah Edwards
(74) *Attorney, Agent, or Firm* — Sughrue Mion, PLLC; Richard C. Turner

(57) ABSTRACT

To estimate the condition of an object precisely, even while the object performs a turning motion, an estimation device for calculating a predicted position of an object existing on the periphery of a host vehicle includes: position calculating circuit for detecting a position of the object; Doppler velocity calculating circuit for calculating a Doppler velocity of the object; host vehicle velocity obtaining circuit for obtaining a host vehicle velocity; host vehicle turning radius obtaining circuit for obtaining a turning radius of the host vehicle; and predicted position calculating circuit for calculating the predicted position of the object on the basis of the position of the object, the Doppler velocity, the host vehicle velocity, and the turning radius of the host vehicle.

18 Claims, 9 Drawing Sheets

(51) Int. Cl.
- *G01S 13/72* (2006.01)
- *G01S 13/87* (2006.01)
- *G01S 13/93* (2020.01)
- *G08G 1/16* (2006.01)
- *G01S 13/58* (2006.01)
- *G01S 13/931* (2020.01)
- *G01S 13/44* (2006.01)
- *G01S 13/34* (2006.01)

(52) U.S. Cl.
CPC .......... *G01S 13/726* (2013.01); *G01S 13/878* (2013.01); *G01S 13/931* (2013.01); *G08G 1/165* (2013.01); *G08G 1/166* (2013.01); *G01S 13/34* (2013.01); *G01S 13/44* (2013.01); *G01S 2013/932* (2020.01); *G01S 2013/93271* (2020.01)

(58) Field of Classification Search
CPC .. G01S 13/878; G01S 13/9029; G01S 13/931; G01S 2013/9353; G01S 2013/9375; G08G 1/165; G08G 1/166
See application file for complete search history.

(56) References Cited

FOREIGN PATENT DOCUMENTS

| | | |
|---|---|---|
| JP | 2008190904 A | 8/2008 |
| JP | 2008269007 A | 11/2008 |
| JP | 2009-042181 A | 2/2009 |
| JP | 2009053925 A | 3/2009 |
| JP | 4465948 B2 | 4/2011 |
| JP | 2016132374 A | 7/2016 |
| WO | 2014192137 A1 | 12/2014 |

OTHER PUBLICATIONS

Communication dated Jun. 5, 2018 from the Japanese Patent Office in counterpart application No. 2017-031868.

ESTIMATION DEVICE, ESTIMATION METHOD, TRACKING DEVICE INCLUDING ESTIMATION DEVICE, AND TRACKING METHOD INCLUDING ESTIMATION METHOD

BACKGROUND OF THE INVENTION

1. Field of the Invention

This invention relates to an estimation device and an estimation method for estimating a condition of an object (referred to hereafter as a target) existing on the periphery of a host vehicle, as well as a tracking device that includes the estimation device and a tracking method that includes the estimation method.

2. Description of the Related Art

In a conventional tracking device, a final position of a target is detected using an observed position of the target, observed using radar, and a predicted future position of the target (see Japanese Patent Application Publication No. 2009-42181, for example).

SUMMARY OF THE INVENTION

However, the prior art has the following problem.

In the conventional tracking device disclosed in Japanese Patent Application Publication No. 2009-42181, the predicted future position of the target cannot be predicted accurately while the target performs a turning motion. Note that here, the target may be an automobile, for example.

In other words, to predict the future condition of a target performing a turning motion, the conventional estimation device assumes that the target is performing a linear motion, and predicts the motion of the target using a tracking filter. Hence, when the target performs a turning motion, the turning motion cannot be ascertained accurately, and therefore the motion of the target cannot be predicted. As a result, the final position of a target positioned on the periphery of a host vehicle cannot be detected accurately.

This invention has been designed in consideration of the problem described above, and an object thereof is to provide an estimation device, an estimation method, a tracking device that includes the estimation device, and a tracking method that includes the estimation method, with which a condition of a target can be estimated precisely even while the target performs a turning motion.

An estimation device according to this invention is a device for calculating a predicted position of a target existing on the periphery of a host vehicle, and includes position calculating circuit for calculating a position of the target, Doppler velocity calculating circuit for calculating a Doppler velocity of the target, host vehicle velocity obtaining circuit for obtaining a host vehicle velocity, host vehicle turning radius obtaining circuit for obtaining a turning radius of the host vehicle, and predicted position calculating circuit for calculating the predicted position of the target on the basis of the position and the Doppler velocity of the target, the host vehicle velocity, and the turning radius of the host vehicle.

Further, an estimation method according to this invention is executed by an estimation device for calculating a predicted position of a target existing on the periphery of a host vehicle, and includes a first step for calculating a position of the target, a second step for calculating a Doppler velocity of the target, a third step for obtaining a host vehicle velocity, a fourth step for obtaining a turning radius of the host vehicle, and a fifth step for calculating the predicted position of the target on the basis of the position and the Doppler velocity of the target, the host vehicle velocity, and the turning radius of the host vehicle.

Furthermore, a tracking device including an estimation device according to this invention is a device for detecting a position of a target existing on the periphery of a host vehicle, and includes the estimation device according to this invention, and position calculating circuit for calculating a smoothed position of the target on the basis of an observed position of the target existing on the periphery of the host vehicle, which is to be detected or has been detected by a reflection wave, and a predicted position of the target.

Moreover, a tracking method including an estimation method according to this invention is a method for detecting a position of a target existing on the periphery of a host vehicle, and includes the estimation method according to this invention, and an eleventh step for calculating a smoothed position of the target on the basis of an observed position of the target existing on the periphery of the host vehicle, which is to be detected or has been detected by a reflection wave, and a predicted position of the target.

According to this invention, the position of the peripheral target is predicted in consideration of respective movement velocities and curvatures of the host vehicle and the peripheral target. As a result, it is possible to obtain an estimation device, an estimation method, a tracking device that includes the estimation device, and a tracking method that includes the estimation method, with which a condition of a target can be estimated precisely even while the target performs a turning motion.

DESCRIPTION OF THE PREFERRED EMBODIMENTS

Figure 1:
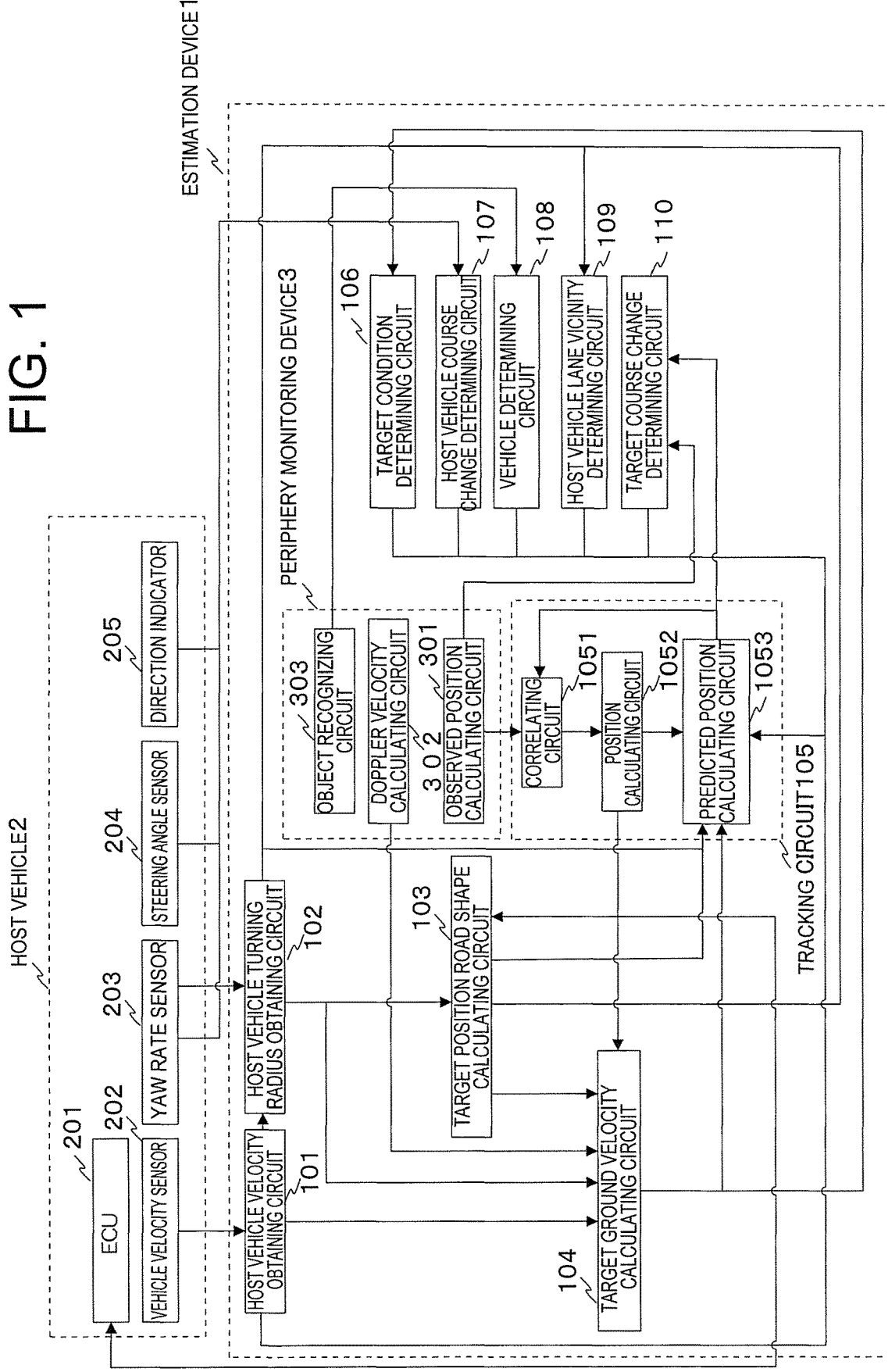
FIG. 1 is a view showing an overall configuration of a system that includes an estimation device according to a first embodiment of this invention.

First, featured configurations and operations of various practical examples included in the first embodiment of this invention will be described briefly below.

Featured configurations and operations of a first practical example are as follows.

An estimation device according to the first practical example is a device for calculating a predicted position of a target existing on the periphery of a host vehicle, and includes position calculating circuit for calculating a position of the target, Doppler velocity calculating circuit for calculating a Doppler velocity of the target, host vehicle velocity obtaining circuit for obtaining a host vehicle velocity, host vehicle turning radius obtaining circuit for obtaining a turning radius of the host vehicle, and predicted position calculating circuit for calculating the predicted position of the target on the basis of the position and the Doppler velocity of the target, the host vehicle velocity, and the turning radius of the host vehicle.

In addition, an estimation method according to the first practical example is executed by the estimation device according to this invention, which calculates a predicted position of a target existing on the periphery of a host vehicle, and includes a first step for calculating a position of the target, a second step for calculating a Doppler velocity of the target, a third step for obtaining a host vehicle velocity, a fourth step for obtaining a turning radius of the host vehicle, and a fifth step for calculating the predicted position of the target on the basis of the position and the Doppler velocity of the target, the host vehicle velocity, and the turning radius of the host vehicle.

Featured configurations and operations of a second practical example are as follows.

In the estimation device according to the second practical example, the predicted position calculating circuit calculates a ground velocity of the target using a following equation $$Vob=(V\times\cos\phi+Vdop)/\cos(\xi)$$

where Vob is the ground velocity of the target, V is the host vehicle velocity, $\phi$ is a bearing direction angle of the target, Vdop is the Doppler velocity, and $\xi$ is an angle formed by a bearing direction of the target and a tangential direction of a position of the target on the right side of a circle around which the target turns, and calculates the predicted position of the target using the calculated ground velocity of the target.

In addition, in the estimation method according to the second practical example, in the fifth step, a ground velocity of the target is calculated using a following equation $$Vob=(V\times\cos\phi+Vdop)/\cos(\xi)$$

where Vob is the ground velocity of the target, V is the host vehicle velocity, $\phi$ is a bearing direction angle of the target, Vdop is the Doppler velocity, and $\xi$ is an angle formed by a bearing direction of the target and a tangential direction of a position of the target on the right side of a circle around which the target turns, and the predicted position of the target is calculated using the calculated ground velocity of the target.

Featured configurations and operations of a third practical example are as follows.

The estimation device according to the third practical example further includes target condition determining circuit for determining whether or not the target is stationary, wherein, when the target is stationary, the predicted position calculating circuit calculates the predicted position of the target along a host vehicle turn using the host vehicle velocity, the turning radius of the host vehicle, and the position of the target.

In addition, the estimation method according to the third practical example further includes a sixth step for determining whether the target is stationary or moving, wherein, when the target is stationary, the predicted position of the target is calculated along a host vehicle turn in the fifth step using the host vehicle velocity, the turning radius of the host vehicle, and the position of the target.

Featured configurations and operations of a fourth practical example are as follows.

The estimation device according to the fourth practical example further includes host vehicle course change determining circuit for determining whether or not the host vehicle is changing course, wherein, when the host vehicle is determined not to be changing course, the predicted position calculating circuit calculates the predicted position of the target on the basis of variation in the position of the target.

In addition, the estimation method according to the fourth practical example further includes a seventh step for determining whether or not the host vehicle is changing course, wherein, when the host vehicle is determined not to be changing course, the predicted position of the target is calculated in the fifth step on the basis of the position of the target and variation in the position of the target.

Featured configurations and operations of a fifth practical example are as follows.

The estimation device according to the fifth practical example further includes vehicle determining circuit for determining whether or not the target is a vehicle, wherein, when the target is not a vehicle, the predicted position calculating circuit calculates the predicted position of the target in accordance with the position of the target and variation in the position of the target.

In addition, the estimation method according to the fifth practical example further includes an eighth step for determining whether or not the target is a vehicle, wherein, when the target is not a vehicle, the predicted position of the target is calculated in the fifth step in accordance with the position of the target and variation in the position of the target.

Featured configurations and operations of a sixth practical example are as follows.

The estimation device according to the sixth practical example further includes host vehicle lane vicinity determining circuit for determining whether or not the target is positioned near a lane of the host vehicle, wherein, when the target is not positioned near the lane of the host vehicle, the predicted position calculating circuit calculates the predicted position of the target on the basis of the position of the target and variation in the position of the target.

In addition, the estimation method according to the sixth practical example further includes a ninth step for determining whether or not the target is positioned near a lane of the host vehicle, wherein, when the target is not positioned near the lane of the host vehicle, the predicted position of the target is calculated in the fifth step on the basis of the position of the target and variation in the position of the target.

Featured configurations and operations of a seventh practical example are as follows.

The estimation device according to the seventh practical example further includes target course change determining circuit for determining whether or not the target is changing course, wherein, when the target is determined to be changing course, the predicted position calculating circuit calculates the predicted position of the target on the basis of the position of the target and variation in the position of the target.

In addition, the estimation method according to the seventh practical example further includes a tenth step for determining whether or not the target is changing course, wherein, when the target is determined to be changing course, the predicted position of the target is calculated in the fifth step on the basis of the position of the target and variation in the position of the target.

Featured configurations and operations of an eighth practical example are as follows.

In the estimation device according to the eighth practical example, the predicted position calculating circuit detects a road shape in the position of the target on the basis of either image information relating to a road image captured by a camera installed in the host vehicle or map information registered in advance, and calculates the predicted position of the target on the basis of the detected road shape.

In addition, in the estimation method according to the eighth practical example, in the fifth step, a road shape in the position of the target is detected on the basis of either image information relating to a road image captured by a camera installed in the host vehicle or map information registered in advance, and the predicted position of the target is calculated on the basis of the detected road shape.

Featured configurations and operations of a ninth practical example are as follows.

A tracking device according to the ninth practical example is a device for detecting a position of a target existing on the periphery of a host vehicle, and includes the estimation device according to this invention, and position calculating circuit for calculating a smoothed position of the target on the basis of an observed position of the target existing on the periphery of the host vehicle, which is to be detected or has been detected by a reflection wave, and a predicted position of the target. Note that the position calculating circuit may be incorporated into the tracking device or mounted externally on the tracking device.

Further, a tracking method according to the ninth practical example is a method for detecting a position of a target existing on the periphery of a host vehicle, and includes the estimation method according to this invention, and an eleventh step for calculating a smoothed position of the target on the basis of an observed position of the target existing on the periphery of the host vehicle, which is to be detected or has been detected by a reflection wave, and a predicted position of the target.

Preferred embodiments of the estimation device, the estimation method, the tracking device that includes the estimation device, and the tracking method that includes the estimation method according to this invention will be described in detail below using the drawings.

First Embodiment

FIG. 1 is a view showing an overall configuration of a system that includes an estimation device according to a first embodiment of this invention. Note that in the first embodiment, a case in which an estimation device 1 is installed in a host vehicle 2 in order to predict a position of a target existing on the periphery of the host vehicle 2 will be described as a specific example.

The estimation device 1 according to the first embodiment is configured to include host vehicle velocity obtaining circuit 101, host vehicle turning radius obtaining circuit 102, target position road shape calculating circuit 103, target ground velocity calculating circuit 104, tracking circuit 105, target condition determining circuit 106, host vehicle course change determining circuit 107, vehicle determining circuit 108, host vehicle lane vicinity determining circuit 109, target course change determining circuit 110, and a periphery monitoring device 3.

Here, the periphery monitoring device 3 is constituted by target observed position calculating circuit 301, target Doppler velocity calculating circuit 302, and object recognizing circuit 303. The periphery monitoring device 3 outputs information including an observed position, a Doppler velocity, and a category of a peripheral target at fixed processing period intervals ($\Delta T$).

Further, the tracking circuit 105 is constituted by correlating circuit 1051, position calculating circuit 1052, and predicted position calculating circuit 1053.

Furthermore, an ECU 201, a vehicle velocity sensor 202, a yaw rate sensor 203, a steering angle sensor 204, and a direction indicator 205 are mounted in the host vehicle 2.

The vehicle velocity sensor 202 is a sensor such as a vehicle velocity pulse sensor for detecting a vehicle velocity of an automobile. The yaw rate sensor 203 is a sensor for detecting an advancement direction of an automobile from an angular acceleration, a geomagnetic direction, and so on. The steering angle sensor 204 is a sensor for detecting a steering angle of the host vehicle 2 by means of an angle sensor or the like mounted on a steering wheel. In addition, a direction indication signal is obtained from the direction indicator 205.

Next, an internal configuration of the estimation device 1 will be described in detail. First, the configuration of the periphery monitoring device 3 according to the first embodiment will be described. The periphery monitoring device 3 is a device capable of measuring the position and Doppler velocity of a peripheral target using an FMCW radar method. An FMCW radar method is described in "Revision: Radar Technology", supervising editor YOSHIDA Takashi, Institute of Electronics, Information, and Communication Engineers book, pp 273-275, for example, and therefore description thereof has been omitted here.

The observed position calculating circuit 301 measures the position of the target by calculating a distance to the peripheral target on the basis of the FMCW radar method, as described above, and measures a bearing angle of the target using a well-known angle measurement method such as a phase monopulse angle measurement method or a super-resolution angle measurement method (an ESPRIT method or a MUSIC method). The observed position calculating circuit 301 then outputs the measured position of the target to the correlating circuit 1051 and the target course change determining circuit 110 as an observed position.

The Doppler velocity calculating circuit 302 measures the Doppler velocity of the target on the basis of the FMCW radar method. The Doppler velocity calculating circuit 302 then outputs the measured Doppler velocity of the target to the target ground velocity calculating circuit 104.

The object recognizing circuit 303 determines whether the target belongs to a vehicle category, a person category, or another object category on the basis of a reception strength (that is, corresponding to a radar reflection surface area) of a reflection wave from the target. Determining the object category to which the target belongs will be referred to hereafter as object recognition. The object recognizing circuit 303 then outputs a recognition result (the object category) to the vehicle determining circuit 108. Note that a method of recognizing an object on the basis of the reception strength of a reflection wave from a target is described in Japanese Patent No. 4665948, for example.

Next, internal configurations of parts of the estimation device 1 other than the periphery monitoring device 3 will be described in sequence. The host vehicle velocity obtaining circuit 101 obtains the host vehicle velocity measured by the vehicle velocity sensor 202 that is mounted in the vehicle 2. The host vehicle velocity obtaining circuit 101 then outputs the obtained host vehicle velocity to the host vehicle turning radius obtaining circuit 102, the target ground velocity calculating circuit 104, and the predicted position calculating circuit 1053.

The turning radius obtaining circuit 102 calculates a turning radius R of the host vehicle from the yaw rate obtained from the yaw rate sensor 203 that is mounted in the vehicle 2, and the host vehicle velocity output by the host vehicle velocity obtaining circuit 101. The host vehicle turning radius obtaining circuit 102 then outputs the calculated turning radius R to the target position road shape calculating circuit 103, the target ground velocity calculating circuit 104, the predicted position calculating circuit 1053, and the host vehicle lane vicinity determining circuit 109.

The target position road shape calculating circuit 103 calculates a road shape in the target position from the turning radius R of the host vehicle, output by the host vehicle turning radius obtaining circuit 102, and a smoothed position of the target, output by the position calculating circuit 1052.

The target position road shape calculating circuit 103 then outputs the calculated road shape in the target position to the target ground velocity calculating circuit 104, the predicted position calculating circuit 1053, and the host vehicle lane vicinity determining circuit 109. Here, the road shape is expressed by a curvature radius and a curvature center of a road.

The target ground velocity calculating circuit 104 calculates a ground velocity of the target on the basis of the Doppler velocity output by the Doppler velocity calculating circuit 302, the smoothed position of the target, output by the position calculating circuit 1052, the host vehicle velocity output by the host vehicle velocity obtaining circuit 101, the turning radius of the host vehicle, output by the host vehicle turning radius obtaining circuit 102, and the road shape in the target position, output by the target position road shape calculating circuit 103.

The target ground velocity calculating circuit 104 then outputs the calculated ground velocity of the target to the predicted position calculating circuit 1053 and the target condition determining circuit 106.

The tracking circuit 105 is constituted by the correlating circuit 1051, the position calculating circuit 1052, and the predicted position calculating circuit 1053, and executes the following tracking processing repeatedly.

Specifically, during the tracking processing of each period, the tracking circuit 105 tracks information on a target relating to the same target as information on a target (target information) including at least the position output by the position calculating circuit 1052, and attaches a label representing an identifier of the target to a measurement result obtained in relation to the target.

The correlating circuit 1051 obtains the observed position of the target, output by the observed position calculating circuit 301 during a current period, as an observed value of the current target position. The correlating circuit 1051 then implements correlation processing on the current target position and a predicted position of the target, calculated by the predicted position calculating circuit 1053 during a previous (a past) period.

During the correlation processing, the correlating circuit 1051 focuses on a distance (a position difference) between the current observed position and the predicted position. When the distance is not within a predetermined determination distance, the correlating circuit 1051 determines that no correlation exists. When the distance is within the predetermined determination distance such that the current observed position and the predicted position are close, on the other hand, the correlating circuit 1051 determines that a correlation exists, and attaches the same label as that of the predicted position to the observed position.

After determining that no correlation exists, the correlating circuit 1051 outputs the observed value of the current target position, obtained from the position calculating circuit 1052, to the position calculating circuit 1052 together with a flag indicating that no correlation exists. After determining that a correlation exists, on the other hand, the correlating circuit 1051 attaches the same label, indicating that a correlation exists, to the current smoothed position of the target and the predicted position of the target that correlates thereto, and outputs this information to the position calculating circuit 1052.

The position calculating circuit 1052 calculates the smoothed position of the target from the observed value of the current target position and the predicted position that were determined by the correlating circuit 1051 to be correlated. The position calculating circuit 1052 then outputs the calculated smoothed position to the target position road shape calculating circuit 103, the target ground velocity calculating circuit 104, the predicted position calculating circuit 1053, and the ECU 201.

The target condition determining circuit 106 determines whether the target is in a stationary condition or a moving condition using a ground velocity Vob of the target, output by the target ground velocity calculating circuit 104. The target condition determining circuit 106 then outputs the determination result to the predicted position calculating circuit 1053 as a target condition flag.

The host vehicle course change determining circuit 107 determines whether or not the host vehicle is changing course using a yaw rate response from the yaw rate sensor 203, which obtains the yaw rate response from the vehicle 2, the steering angle from the steering angle sensor 204, a direction indicating operation signal from the direction indicator 205, and so on. The host vehicle course change determining circuit 107 then outputs the determination result to the predicted position calculating circuit 1053 as a host vehicle course change flag.

The vehicle determining circuit 108 determines whether or not the target is a vehicle using the object category output by the object recognizing circuit 303. The vehicle determining circuit 108 then outputs the determination result to the predicted position calculating circuit 1053 as a vehicle flag.

The host vehicle lane vicinity determining circuit 109 determines whether or not the target exists in the vicinity of a host vehicle lane using the host vehicle turning radius R output by the host vehicle turning radius obtaining circuit 102, and the target position road shape output by the target position road shape calculating circuit 103. The host vehicle lane vicinity determining circuit 109 then outputs the determination result to the predicted position calculating circuit 1053 as a host vehicle lane vicinity flag.

The target course change determining circuit 110 determines whether or not the target is changing course using the observed position of the current period, output by the observed position calculating circuit 301, and the current predicted position calculated in the previous period and output by the predicted position calculating circuit 1053 during the previous period. The target course change determining circuit 110 then outputs the determination result to the predicted position calculating circuit 1053 as a target course change flag.

The predicted position calculating circuit 1053 calculates the predicted position of the target during the next period in accordance with the smoothed position of the target, output by the position calculating circuit 1052, the host vehicle velocity output by the host vehicle velocity obtaining circuit 101, the turning radius of the host vehicle, output by the host vehicle turning radius obtaining circuit 102, information indicating the road shape in the target position, output by the target position road shape calculating circuit 103, the ground velocity of the target, output by the target ground velocity calculating circuit 104, the target condition flag output by the target condition determining circuit 106, the host vehicle course change flag output by the host vehicle course change determining circuit 107, the vehicle flag output by the vehicle determining circuit 108, the host vehicle lane vicinity flag output by the host vehicle lane vicinity determining circuit 109, and the target course change flag output by the target course change determining circuit 110.

The predicted position calculating circuit 1053 then outputs the calculated predicted position of the target during the next period to the correlating circuit 1051 and the target course change determining circuit 110.

Figure 2:
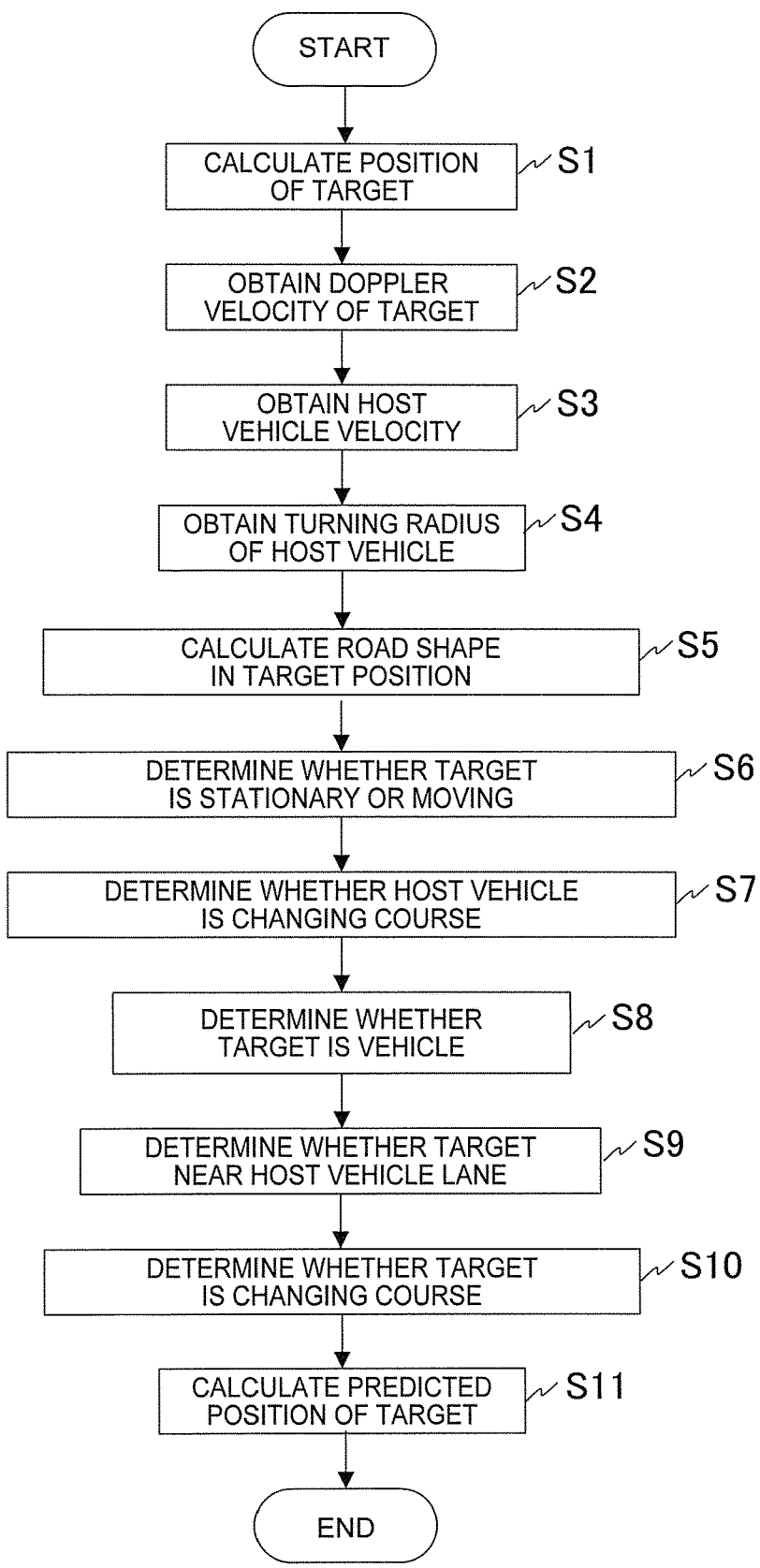
FIG. 2 is a flowchart showing a series of operations executed by the estimation device according to the first embodiment of this invention.

Next, a series of operations executed by the estimation device configured as shown in FIG. 1 will be described using a flowchart. FIG. 2 is a flowchart showing a series of operations executed by the estimation device 1 according to the first embodiment of this invention.

In step S1, the position calculating circuit 1052 calculates the smoothed position of the target using the observed position of the target and the predicted position of the target, output by the correlating circuit 1051. The position calculating circuit 1052 then outputs the calculated smoothed position of the target to the target position road shape calculating circuit 103, the target ground velocity calculating circuit 104, the predicted position calculating circuit 1053, and the ECU 201.

The operation performed in step S1 will now be described in detail.

The observed position calculating circuit 301 measures an observed value of the position (referred to hereafter as the observed position) (Xo_i, Yo_i) of a target existing on the periphery of the host vehicle during the current period. The observed position calculating circuit 301 then outputs the measured observed position of the target to the correlating circuit 1051.

The correlating circuit 1051 correlates the observed position of the target during the current period, output by the observed position calculating circuit 301, with a predicted position (Xp_i, Yp_i) of the target that was output by the predicted position calculating circuit 1053 during the previous period.

When no correlation is determined to exist, the correlating circuit 1051 attaches a label indicating a new tracking subject to the current target position, and outputs the observed position to the position calculating circuit 1052. When a correlation is determined to exist, on the other hand, the correlating circuit 1051 attaches the same label to the target position of the current period and the predicted position of the target, for which a correlation was found to exist, and outputs the observed position and the predicted position to the position calculating circuit 1052.

The position calculating circuit 1052 calculates the smoothed position of the target from the observed position and predicted position determined by the correlating circuit 1051 to be correlated using Equations (1) and (2), shown below. Note that the smoothed position of the target, calculated using Equations (1) and (2), is referred to as a smoothed position to differentiate the smoothed position from the observed position and the predicted position.

$$X\_i = \alpha\_x \times Xo\_i + (1-\alpha\_x) \times Xp\_i \quad (1)$$

$$Y\_i = \alpha\_y \times Yo\_i + (1-\alpha\_y) \times Yp\_i \quad (2)$$

In Equation (1), X_i denotes a component (referred to hereafter as a lateral position) of the smoothed position of the target in a left-right direction of the host vehicle, where Xo_i represents the lateral position of the observed position of the target and Xp_i represents the lateral position of the predicted position of the target. $\alpha\_x$ denotes a coefficient (a gain) for determining a degree of smoothness relative to the lateral position.

Further, in Equation (2), Y_i denotes a component (referred to hereafter as a longitudinal position) of the smoothed position of the target in an advancement direction of the host vehicle, where Yo_i represents the longitudinal position of the observed position of the target and Yp_i represents the longitudinal position of the predicted position of the target. $\alpha\_y$ denotes a coefficient (a gain) for determining a degree of smoothness relative to the longitudinal position.

$\alpha\_x$ and $\alpha\_y$ may be designed freely by a designer in consideration of characteristics such as an observation error. Note that in the first embodiment, however, $\alpha\_x=0.4$ and $\alpha\_y=0.7$.

When the observed position is determined by the correlating circuit 1051 not to be correlated, on the other hand, the position calculating circuit 1052 calculates the observed position as is as the smoothed position.

The position calculating circuit 1052 then outputs the calculated smoothed position to the target position road shape calculating circuit 103, the target ground velocity calculating circuit 104, the predicted position calculating circuit 1053, and the ECU 201.

Returning to FIG. 2, next, in step S2, the Doppler velocity calculating circuit 302 measures a Doppler velocity Vdop of the target. The Doppler velocity calculating circuit 302 then outputs the measured Doppler velocity Vdop to the target ground velocity calculating circuit 104 together with the smoothed position of the target, obtained from the position calculating circuit 1052 as the smoothed position.

Note that the Doppler velocity Vdop is set to be positive when oriented outward (in a separating direction), as seen from the host vehicle, relative to a bearing direction of the target, and negative when oriented inward (in an approaching direction).

Next, in step S3, the host vehicle velocity obtaining circuit 101 obtains a host vehicle velocity V during the current period from the vehicle velocity sensor 202. The host vehicle velocity obtaining circuit 101 then outputs the host vehicle velocity V during the current period to the host vehicle turning radius obtaining circuit 102, the target ground velocity calculating circuit 104, and the predicted position calculating circuit 1053.

Next, in step S4, the host vehicle turning radius obtaining circuit 102 obtains a yaw rate Y during the current period from the yaw rate sensor 203. The host vehicle turning radius obtaining circuit 102 then calculates the host vehicle turning radius R from Equation (3), shown below, using the host vehicle velocity V output by the host vehicle velocity obtaining circuit 101 and the yaw rate Y.

$$R = V/Y \tag{3}$$

Further, the host vehicle turning radius obtaining circuit 102 outputs the value of the host vehicle turning radius R to the target position road shape calculating circuit 103, the target ground velocity calculating circuit 104, the host vehicle lane vicinity determining circuit 109, and the predicted position calculating circuit 1053.

Figure 3:
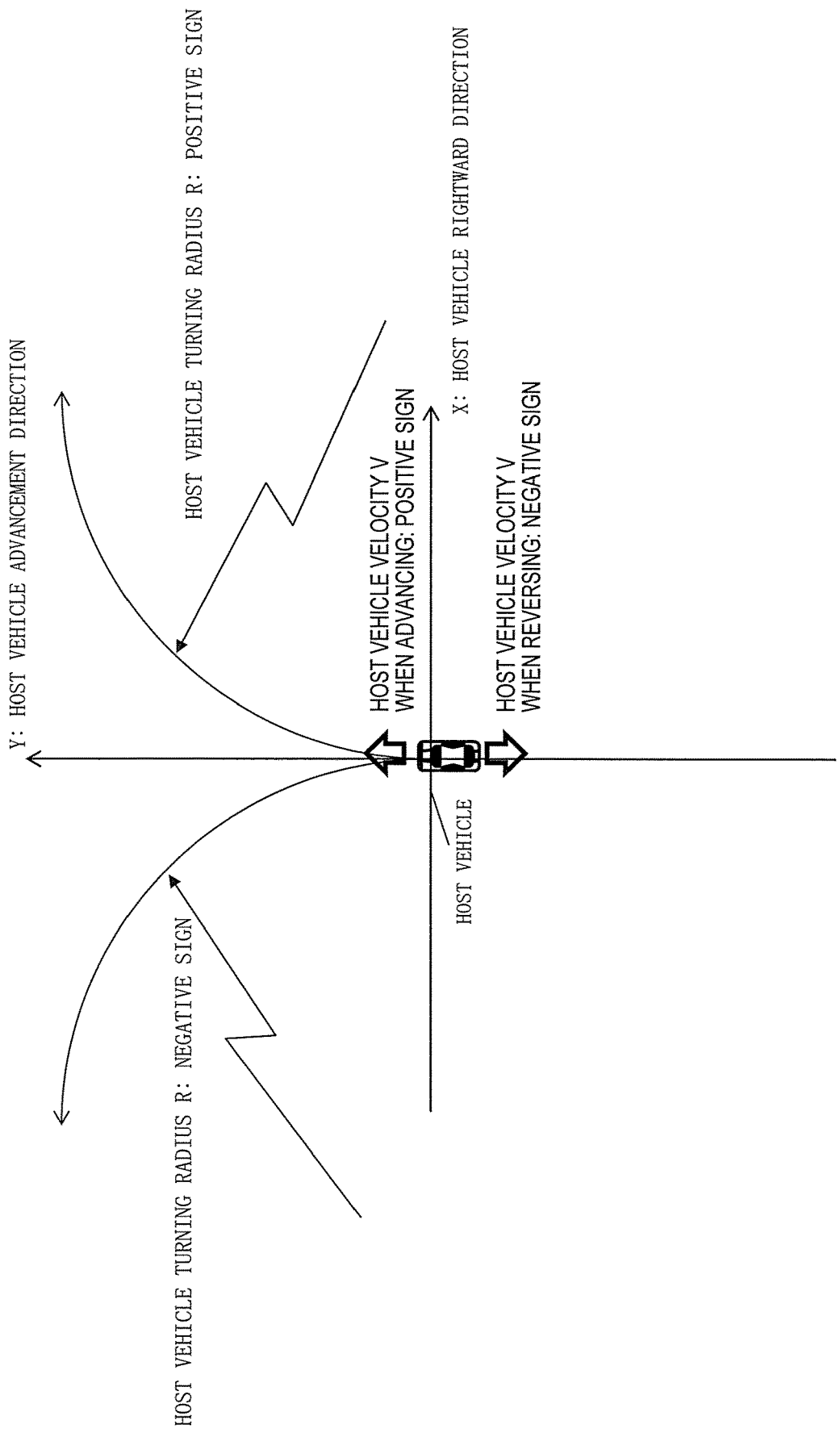
FIG. 3 is an illustrative view showing a manner in which signs of a host vehicle velocity and a host vehicle turning radius are obtained, according to the first embodiment of this invention.

FIG. 3 is an illustrative view showing a manner in which signs of the host vehicle velocity and the host vehicle turning radius are obtained, according to the first embodiment of this invention. As shown in FIG. 3, the host vehicle turning radius takes a positive value when the host vehicle 2 turns right, and takes a negative value when the host vehicle 2 turns left.

Next, in step S5, the target position road shape calculating circuit 103 calculates the road shape in the target position from the turning radius R of the host vehicle, output by the host vehicle turning radius obtaining circuit 102, and the smoothed position (X_i, Y_i) of the target, output by the position calculating circuit 1052. Here, the road shape in the target position is expressed by a curvature center Oob (Cx, Cy) and a curvature radius Rob.

The target position road shape calculating circuit 103 then outputs the calculated road shape in the target position to the target ground velocity calculating circuit 104, the host vehicle lane vicinity determining circuit 109, and the predicted position calculating circuit 1053.

The target position road shape calculating circuit 103 calculates the curvature radius Rob of the road in the target position using Equation (4), shown below.

$$Rob = \sqrt{\{(X\_i - R)^2 + (Y\_i)^2\}} \tag{4}$$

In Equation (4), X_i denotes the smoothed lateral position of the target, calculated by the position calculating circuit 1052, Y_i denotes the smoothed longitudinal position of the target, calculated by the position calculating circuit 1052, and R denotes the turning radius of the host vehicle, output by the host vehicle turning radius obtaining circuit.

Further, the target position road shape calculating circuit 103 calculates the curvature center Oob (Cx, Cy) of the road shape in the target position using Equation (5), shown below.

$$Oob(Cx, Cy) = (R, 0) \tag{5}$$

Assuming the host vehicle lane has a uniform curvature, a lane on the periphery of the host vehicle 2 extends alongside the host vehicle lane. Therefore, when the target is in the host vehicle lane or in a lane on the periphery of the host vehicle lane and the target is traveling along the lane, the curvature center of the turn implemented by the host vehicle matches the curvature center of the road along which the target is traveling (the curvature center of the turn implemented by the target).

The curvature radius of the road along which the target is traveling (the turning radius of the target) is determined by calculating an offset from the host vehicle turning radius relative to the curvature center of the turn implemented by the host vehicle. Accordingly, the target position road shape calculating circuit 103 calculates the curvature radius Rob of the road in the target position using Equation (4).

The target ground velocity calculating circuit 104 calculates the ground velocity Vob of the target from the smoothed position (X_i, Y_i) of the target, output by the position calculating circuit 1052, the Doppler velocity Vdop output by the Doppler velocity calculating circuit 302, the host vehicle velocity V output by the host vehicle velocity obtaining circuit 101, the turning radius R of the host vehicle, output by the host vehicle turning radius obtaining circuit 102, and the road shape (the curvature radius Rob and the curvature center Oob (Cx, Cy)) in the target position, output by the target position road shape calculating circuit 103.

The target ground velocity calculating circuit 104 then outputs the calculated ground velocity Vob of the target to the predicted position calculating circuit 1053 and the target condition determining circuit 106.

The target ground velocity calculating circuit 104 calculates the ground velocity Vob of the target using Equation (6), shown below.

$$Vob = (V \times \cos \phi + Vdop)/\cos(\xi) \tag{6}$$

Figure 4:
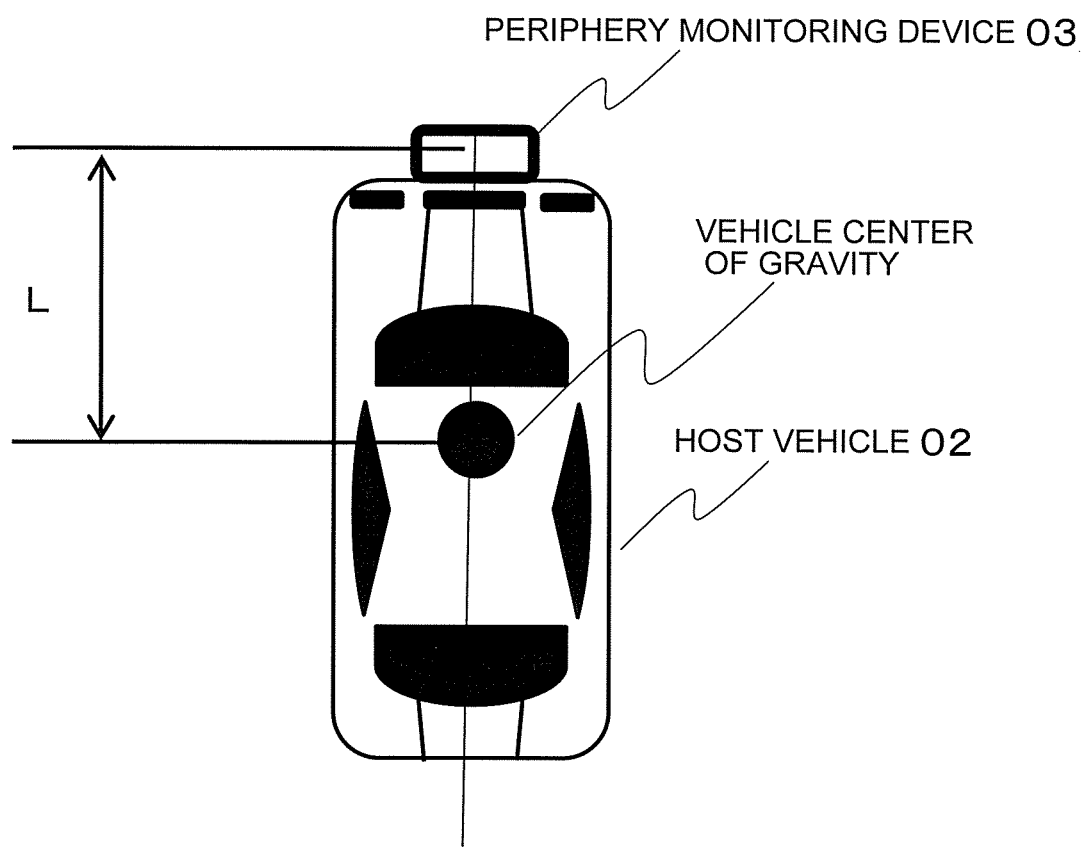
FIG. 4 is an illustrative view showing a positional relationship between a host vehicle and a periphery monitoring device, according to the first embodiment of this invention.

Equation (6) will now be described using FIGS. 4 and 5. FIG. 4 is an illustrative view showing a positional relationship between the host vehicle 2 and the periphery monitoring device 3, according to the first embodiment of this invention. As shown in FIG. 4, it is assumed in the following description that the periphery monitoring device 3 is mounted in a central portion of a front surface of the host vehicle 2 and disposed in a position located a distance L from a vehicle center of gravity.

Note that unless specified otherwise, the term "position", when used in this description, indicates a position seen from the vehicle center of gravity of the host vehicle.

Figure 5:
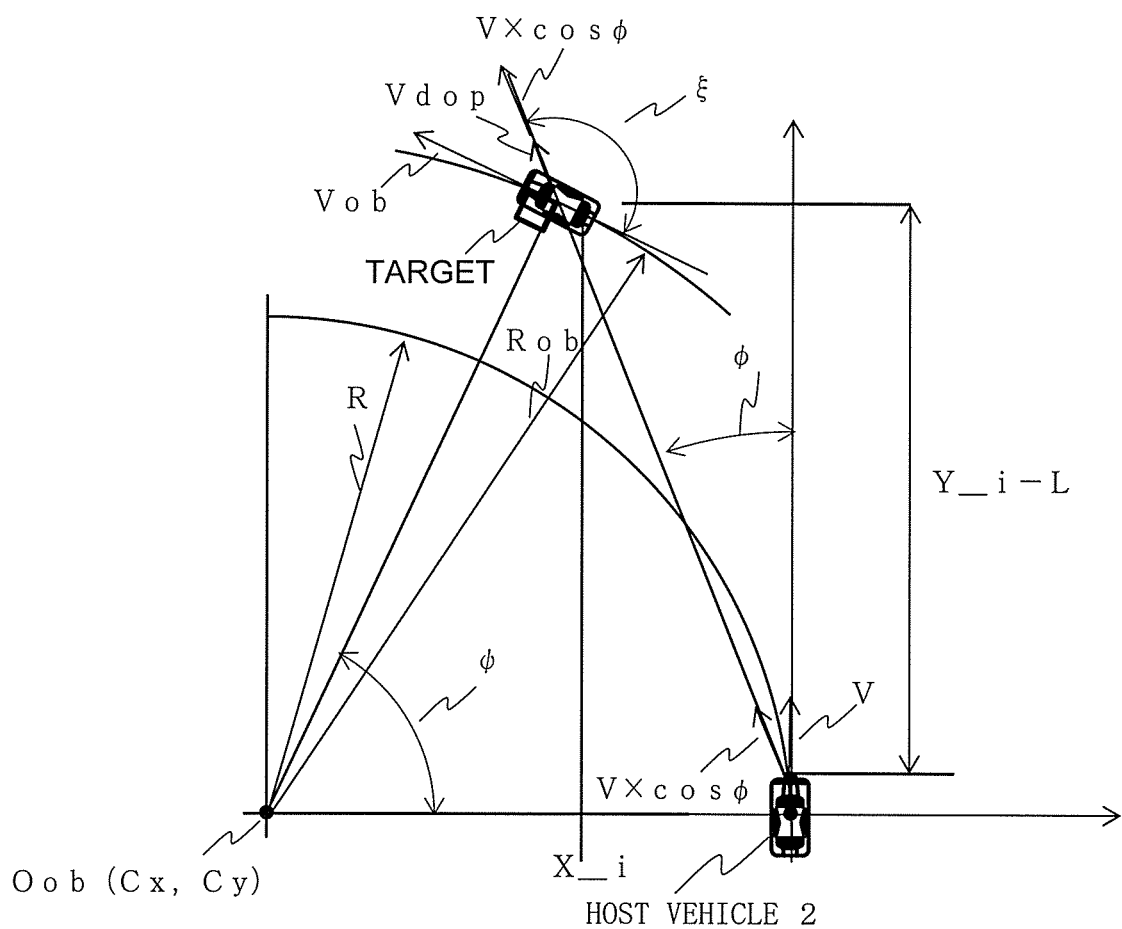
FIG. 5 is an illustrative view showing a method for determining a ground velocity from a Doppler velocity, according to the first embodiment of this invention.

Further, FIG. 5 is an illustrative view showing a method for determining a ground velocity from a Doppler velocity, according to the first embodiment of this invention. When a bearing direction angle of the target, as seen from the periphery monitoring device 3, is set as $\phi$, the Doppler velocity Vdop is a difference between a $\phi$ direction component of the ground velocity Vob of the target and a $\phi$ component $V \times \cos \phi$ of the host vehicle velocity. Accordingly, the $\phi$ direction component of the ground velocity Vob of the target is $$V \times \cos \phi + Vdop.$$

Assuming that the target is traveling around a circle corresponding to the road shape (the curvature radius Rob and the curvature center (Cx, Cy)), the ground velocity Vob of the target is determined as shown above in Equation (6) using the velocity V of the host vehicle, the Doppler velocity Vdop of the target, the bearing direction angle $\phi$ of the target, and an angle $\xi$ formed by the bearing direction of the target (an outward direction as seen from the periphery monitoring device 3) and a tangential direction of the position of the target on the right side of the circle around which the target turns.

Here, $\xi$ can be determined from Equation (7), shown below, when $\psi + \phi \geq 0$, and can be determined from Equation (8), shown below, when $\psi + \phi < 0$.

$$\xi = \pi - (\psi + \phi) \tag{7}$$

$$\xi = \pi + (\omega + \phi) \tag{8}$$

$\phi$ in Equations (6) to (8) can be determined from Equation (9), shown below.

$$\phi = a\tan 2(X\_i, (Y\_i - L)) \tag{9}$$

Here, the function $a\tan 2(y, x)$ in Equation (9) is a function for determining an arc tangent, with which an angle of a vector expressed by a point (x, y) and the x axis is returned by a real number within a range of $-\pi$ to $\pi$. Note, however, that when x=0 and y=0, an invalid value is returned.

Figure 6:
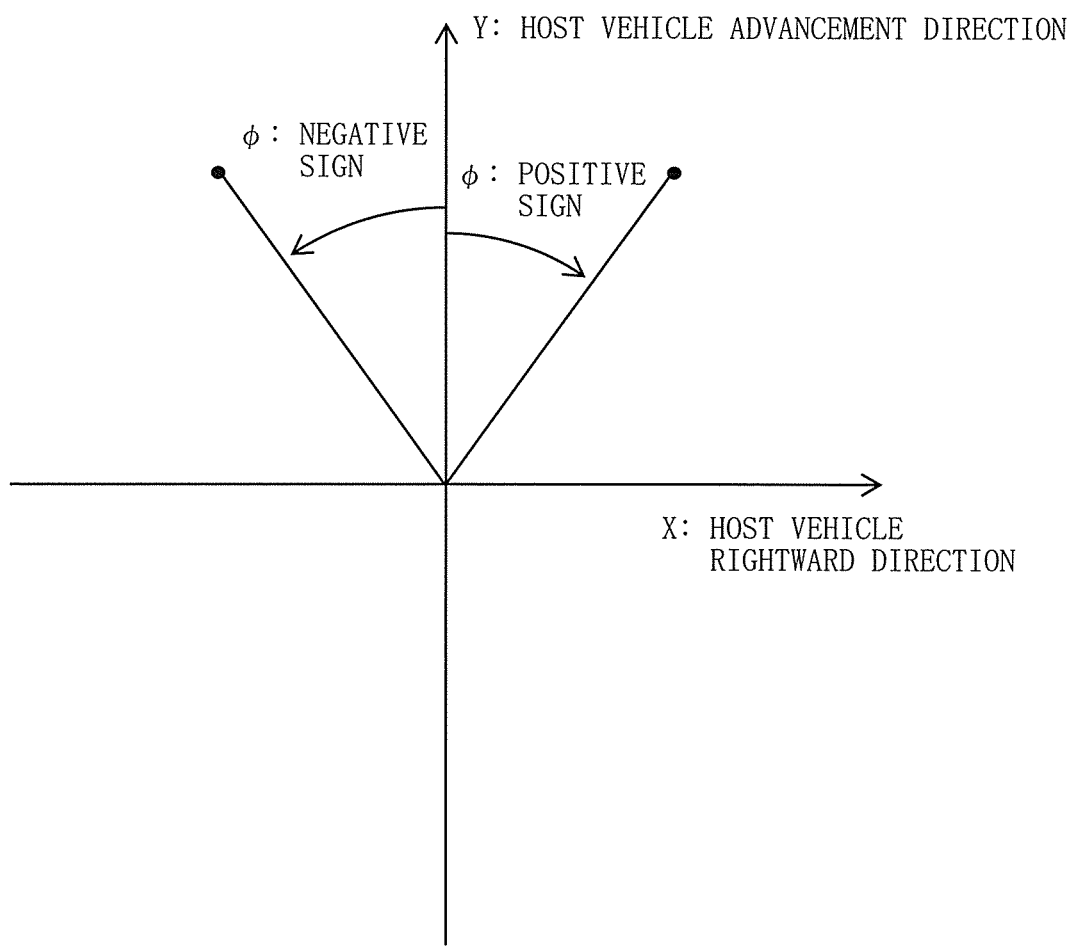
FIG. 6 is an illustrative view showing a manner in which a value of an angle $\phi$ is obtained, according to the first embodiment of this invention.

FIG. 6 is an illustrative view showing a manner in which the value of the angle $\phi$ is obtained, according to the first embodiment of this invention. As shown in FIG. 6, using the ordinate as a reference, $\phi$ takes a positive value on the right side (clockwise turning) and a negative value on the left side (counter-clockwise turning), and takes a value within a range of $-\pi<\phi<\pi$.

Further, $\psi$ can be determined from Equation (10), shown below.

$$\psi = a\tan 2((Y\_i-Cy),(X\_i-Cx)) \qquad (10)$$

Figure 7:
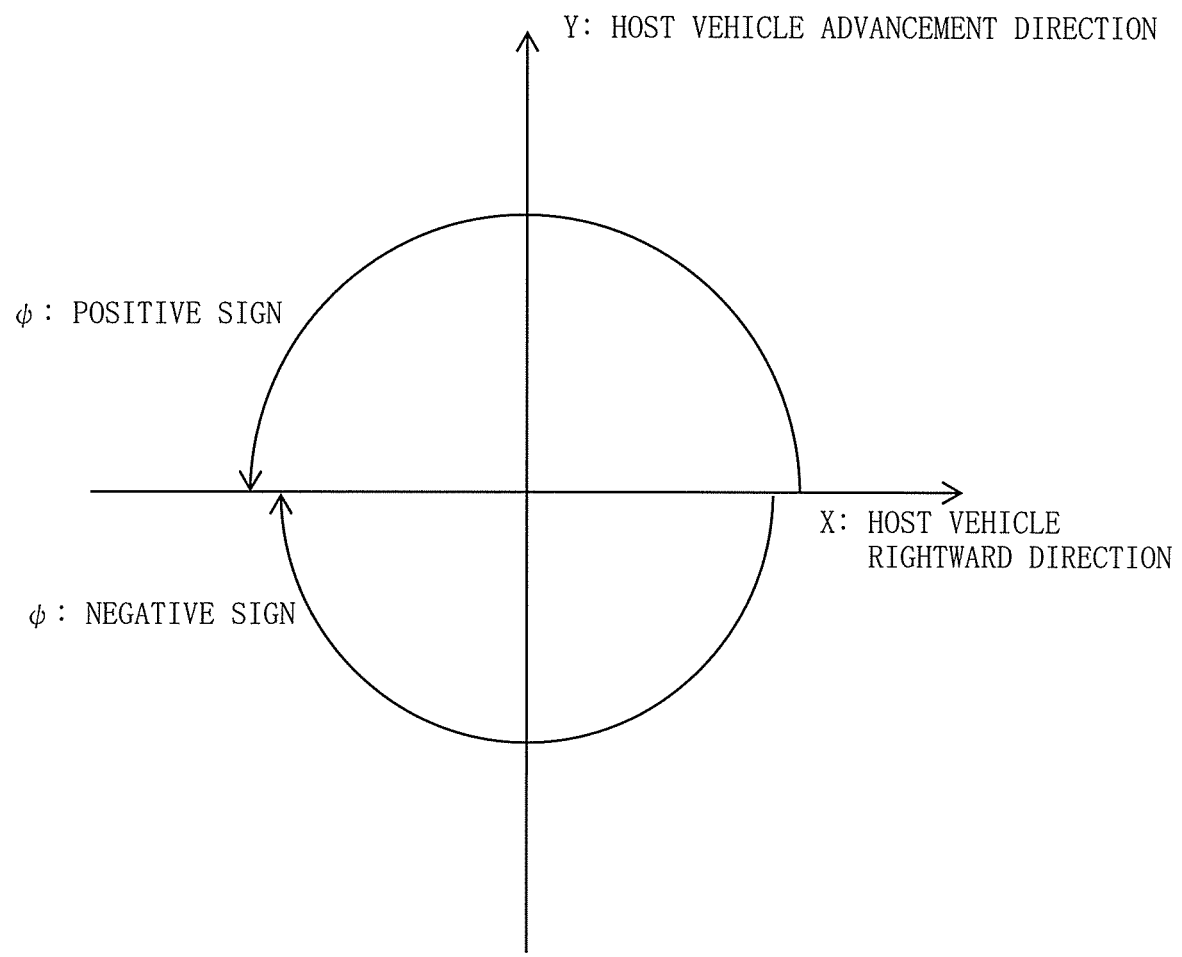
FIG. 7 is an illustrative view showing a manner in which a value of an angle $\psi$ is obtained, according to the first embodiment of this invention.

FIG. 7 is an illustrative view showing a manner in which the value of the angle $\psi$ is obtained, according to the first embodiment of this invention. As shown in FIG. 7, using the ordinate as a reference, $\psi$ takes a positive value on the right side and a negative value on the left side, and takes a value within a range of $-\pi<\omega<\pi$. When the ground velocity Vob of the target is calculated using Equations (6) to (10), Vob takes a positive value on the right side and a negative value on the left side of the turning circle of the target.

Next, returning to FIG. 2, in step S6, the target condition determining circuit 106 determines whether the target is in a stationary condition or a moving condition using the ground velocity Vob of the target, output by the target ground velocity calculating circuit 104. The target condition determining circuit 106 then outputs the determination result to the predicted position calculating circuit 1053 as the target condition flag.

The target condition determining circuit 106 determines that the target is in a stationary condition when an absolute value of Vob is smaller than a preset threshold, and determines that the target is in a moving condition when the absolute value of Vob equals or exceeds the preset threshold. The threshold can be designed freely in consideration of the observation precision of the Doppler velocity and so on. Note, however, that in the first embodiment, the threshold is set provisionally at a value of 5 [km/h].

Next, in step S7, the host vehicle course change determining circuit 107 determines whether or not the host vehicle is changing course using the yaw rate response from the yaw rate sensor 203, which obtains the yaw rate response from the vehicle 2, the steering angle from the steering angle sensor 204, the direction indicating operation signal from the direction indicator 205, and so on.

For example, when the direction indicating operation signal shows that a direction indicating operation is underway and the value obtained from the steering angle sensor has varied greatly, the host vehicle course change determining circuit 107 determines that the host vehicle is changing course. Further, when the direction indicating operation signal shows that a direction indicating operation is not underway after the host vehicle course change determining circuit 107 has determined that the host vehicle is changing course, the host vehicle course change determining circuit 107 determines that the host vehicle has finished changing course. The host vehicle course change determining circuit 107 then outputs the determination result to the predicted position calculating circuit 1053 as the host vehicle course change flag.

Next, in step S8, the vehicle determining circuit 108 determines whether or not the target is a vehicle using the object category output by the object recognizing circuit 303. The vehicle determining circuit 108 then outputs the determination result to the predicted position calculating circuit 1053 as the vehicle flag.

Next, in step S9, the host vehicle lane vicinity determining circuit 109 determines whether or not the target exists in the vicinity of the host vehicle lane using the host vehicle turning radius R output by the host vehicle turning radius obtaining circuit 102, and the road shape (the curvature radius Rob and the curvature center (Cx, Cy)) in the target position, output by the target position road shape calculating circuit 103. The host vehicle lane vicinity determining circuit 109 then outputs the determination result to the predicted position calculating circuit 1053 as the host vehicle lane vicinity flag.

The host vehicle lane vicinity determining circuit 109 determines that the target is in the vicinity of the host vehicle lane when an absolute value of a difference between the turning radius R of the host vehicle and the curvature radius Rob of the road shape in the target position is equal to or smaller than a threshold ThR and a distance between the turn center (R, 0) of the host vehicle and the curvature center (Cx, Cy) of the road shape in the target position is equal to or smaller than a threshold Thd.

The thresholds ThR and Thd may be set freely on the basis of a design concept of the designer, processing results obtained as actual data, and so on. Note, however, that in the first embodiment, Thr is set at 7.2 [m], which is twice the width of a lane of a road built for vehicles of a typical width, while Thd is set at 5.0 [m].

Next, in step S10, the target course change determining circuit 110 determines whether or not the target is changing course using the observed position (Xo_i, Yo_i) of the current period, output by the observed position calculating circuit 301, and the current predicted position (Xp_i, Yp_i) calculated in the previous period and output by the predicted position calculating circuit 1053 in the previous period. The target course change determining circuit 110 then outputs the determination result to the predicted position calculating circuit 1053 as the target course change flag.

The target course change determining circuit 110 determines that the target is changing course when an absolute value of a difference between the lateral position Xo_i of the observed position of the current period, output by the observed position calculating circuit 301, and the lateral position Xp_i of the current predicted position, output by the predicted position calculating circuit 1053 in the previous period, equals or exceeds a threshold Thc.

The threshold Thc may be set freely on the basis of the design concept of the designer, processing results obtained as actual data, and so on from the precision with which the periphery monitoring device 3 measures the observed position, the measurement precision of the Doppler velocity, and so on. Note, however, that in the first embodiment, Thc is set provisionally at $\Delta T \times Vdop \times 2.0$.

Next, in step S11, the predicted position calculating circuit 1053 calculates the predicted position (Xp_i+1, Yp_i+1) of the target during the next period in accordance with the smoothed position (X_i, Y_i) of the target, output by the position calculating circuit 1052, the host vehicle velocity V, output by the host vehicle velocity obtaining circuit 101, the turning radius R of the host vehicle, output by the host vehicle turning radius obtaining circuit 102, the information (the curvature radius Rob and the curvature center Oob (Cx, Cy)) indicating the road shape in the target position, output by the target position road shape calculating circuit 103, the ground velocity Vob of the target, output by the target ground velocity calculating circuit 104, the target condition flag, output by the target condition determining circuit 106, the host vehicle course change flag, output by the host vehicle course change determining circuit 107, the vehicle flag, output by the vehicle determining circuit 108, the host vehicle lane vicinity flag, output by the host vehicle lane vicinity determining circuit 109, and the target course change flag, output by the target course change determining circuit 110.

The predicted position calculating circuit 1053 then outputs the calculated predicted position (Xp_i+1, Yp_i+1) of the target during the next period to the correlating circuit 1051 and the target course change determining circuit 110.

Figure 8:
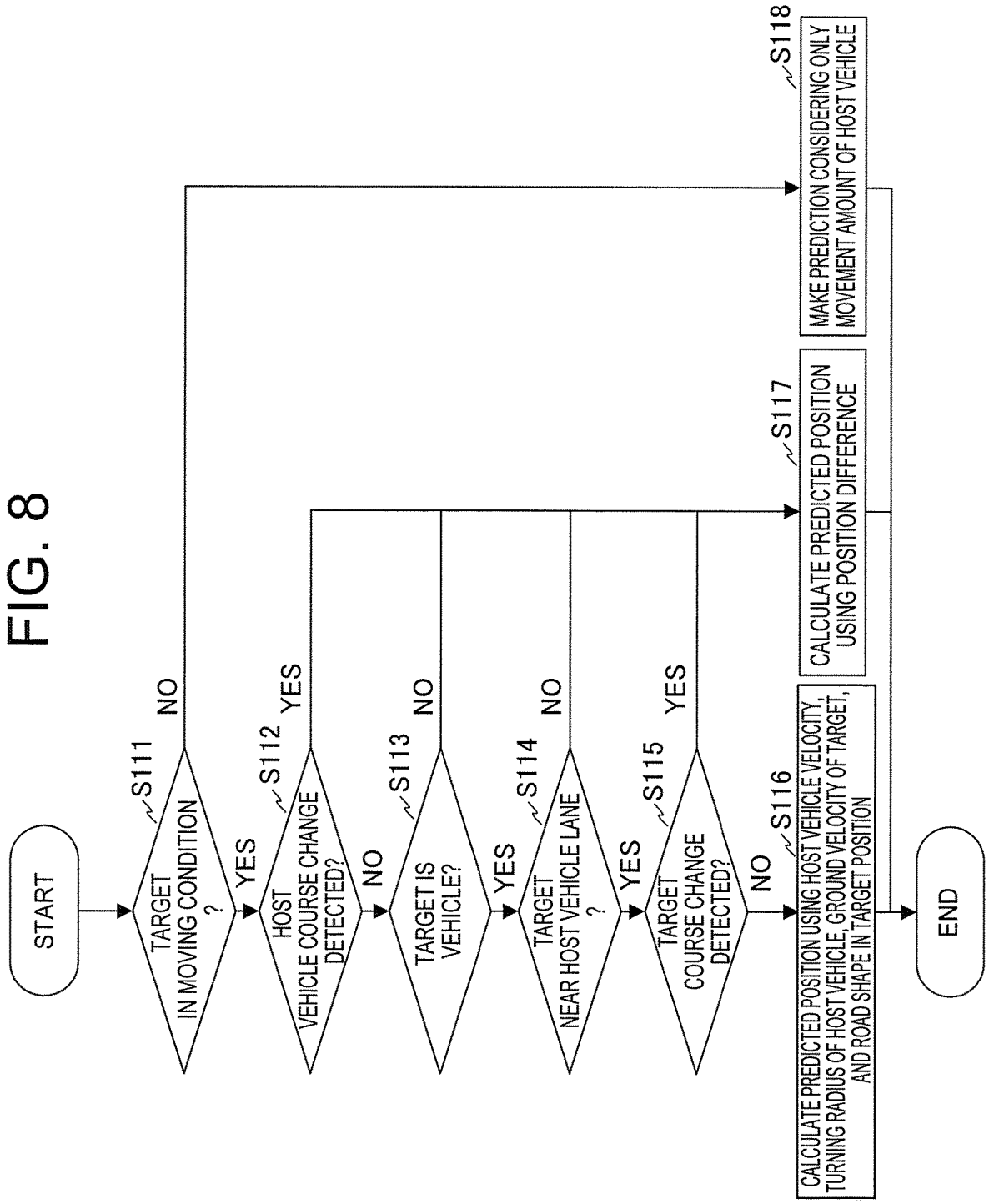
FIG. 8 is a flowchart showing a series of operations executed by predicted position calculating circuit according to the first embodiment of this invention.

Operations executed by the predicted position calculating circuit 1053 will now be described in detail using a flowchart. FIG. 8 is a flowchart showing a series of operations executed by the predicted position calculating circuit 1053 according to the first embodiment of this invention.

In step S111, when the target condition flag output by the target condition determining circuit 106 in step S6 indicates that the target is moving, the predicted position calculating circuit 1053 advances to step S112. When the target condition flag indicates that the target is stationary, on the other hand, the predicted position calculating circuit 1053 advances to step S118.

When the target is stationary, the ground velocity Vob of the target, determined using Equation (6), is ideally zero. In actuality, however, errors occurs in the observed position of the target and the relative velocity, and as a result, Vob does not reach zero. To eliminate the effect of the error in Vob, the predicted position of a stationary object is calculated (i.e. the predicted position is calculated assuming that Vob is zero) in step S118 in relation to the target, which is considered to be stationary. In so doing, the predicted position of the stationary target can be determined more accurately.

When, after the predicted position calculating circuit 1053 advances to step S112, the host vehicle course change flag output by the host vehicle course change determining circuit 107 in step S7 indicates a course change by the host vehicle, the predicted position calculating circuit 1053 advances to step S117. When the host vehicle course change flag does not indicate a course change by the host vehicle, on the other hand, the predicted position calculating circuit 1053 advances to step S113.

When the host vehicle changes course, the shape of the road on which the host vehicle exists is likely to differ greatly from the road shape determined from the turning radius of the host vehicle in Equations (4) and (5). By determining the predicted position of the target on the basis of the position and variation in the position in step S117 when the host vehicle course change flag indicates a course change by the host vehicle in step S112, a situation in which the predicted position is predicted in step S116 to be on the road shape determined from the turning radius of the host vehicle, leading to an increased error in the predicted position, can be prevented from occurring.

When, after the predicted position calculating circuit 1053 advances to step S113, the vehicle flag output by the vehicle determining circuit 108 in step S8 indicates that the target is a vehicle, the predicted position calculating circuit 1053 advances to step S114. When the vehicle flag indicates that the target is not a vehicle, on the other hand, the predicted position calculating circuit 1053 advances to step S117.

A non-vehicular target (a person, for example) is unlikely to move along the road shape. By determining the predicted position on the basis of the position and variation in the position in step S117 when the vehicle flag indicates that the target is not a vehicle in step S113, a situation in which the predicted position is predicted to be on the road shape in step S116, leading to an increased error in the predicted position, can be prevented from occurring.

When, after the predicted position calculating circuit 1053 advances to step S114, the host vehicle lane vicinity flag output by the host vehicle lane vicinity determining circuit 109 in step S9 indicates that the target is in the vicinity of the host vehicle lane, the predicted position calculating circuit 1053 advances to step S115. When the host vehicle lane vicinity flag indicates that the target is not in the vicinity of the host vehicle lane, on the other hand, the predicted position calculating circuit 1053 advances to step S117.

A target that is far from the host vehicle lane is unlikely to move along the same road shape as the host vehicle. By determining the predicted position on the basis of the position and variation in the position in step S117, a situation in which a target determined not to be in the vicinity of the host vehicle lane in step S114 is predicted to be on the road shape in step S116, leading to an increased error in the predicted position, can be prevented from occurring.

When, after the predicted position calculating circuit 1053 advances to step S115, the target course change flag output by the target course change determining circuit 110 in step S10 indicates that the target is not changing course, the predicted position calculating circuit 1053 advances to step S117. When the target course change flag indicates that the target is currently changing course, on the other hand, the predicted position calculating circuit 1053 advances to step S116.

When changing course, the target is unlikely to move along the road shape. By determining the predicted position on the basis of the position and variation in the position in step S117 when a course change is determined to be underway in step S115, a situation in which the predicted position is predicted to be on the road shape in step S116, leading to an increased error in the predicted position, can be prevented from occurring.

Finally, after advancing to step S116, the predicted position calculating circuit 1053 calculates the predicted position (Xp_i+1, Yp_i+1) of the target during the next period using the smoothed position (X_i, Y_i) of the target during the current period of the target, the host vehicle velocity V, the turning radius R of the host vehicle, the ground velocity Vob of the target, and the road shape (the curvature radius Rob and the curvature center (Cx, Cy)) in the target position.

Note that the determination processing of steps S111 to S115 in FIG. 8 is not limited to the order described above, and steps S111 to S115 may be omitted as appropriate, or the order thereof may be reversed.

Figure 9:
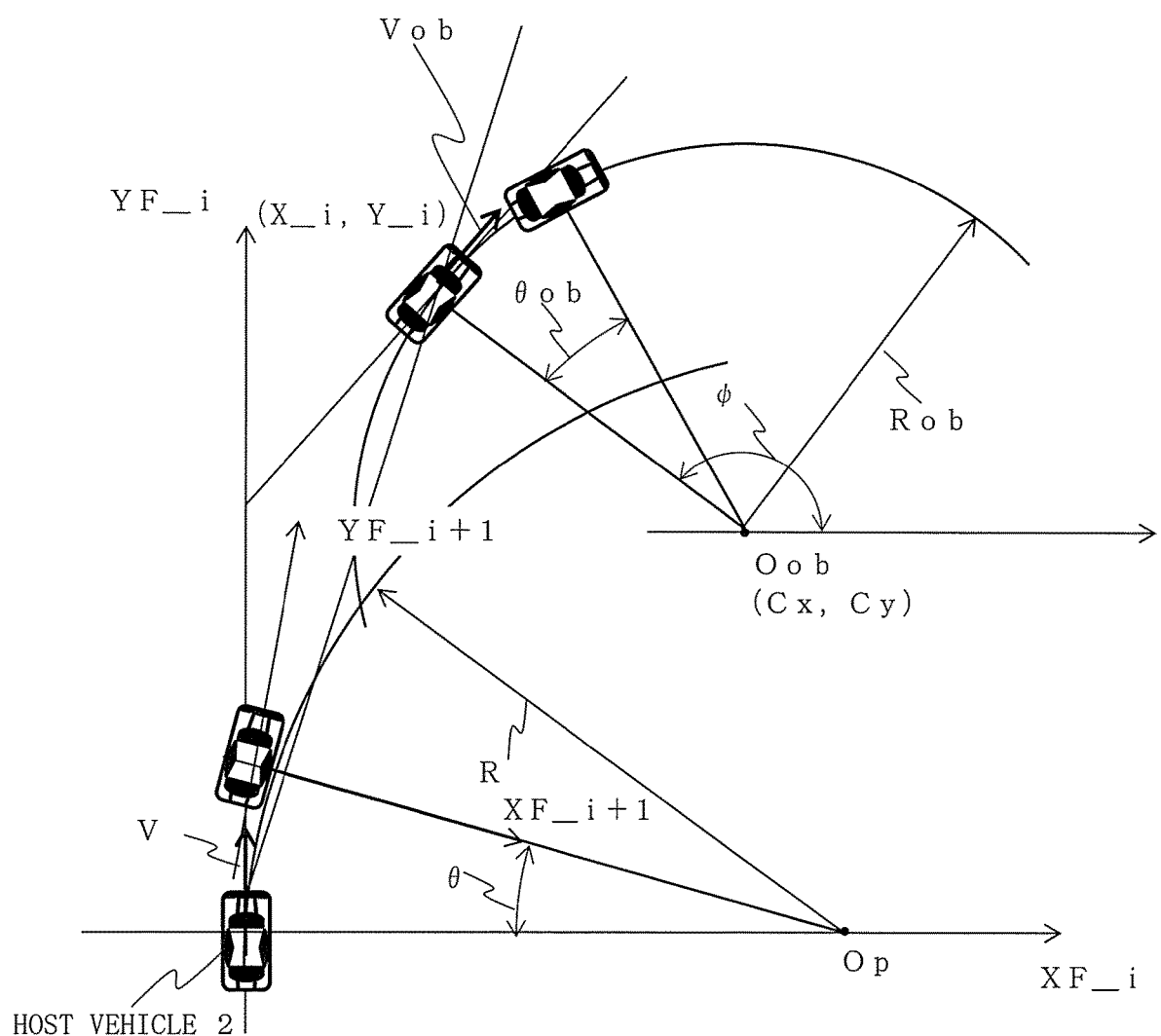
FIG. 9 is an illustrative view showing a predicted position calculation method executed by the predicted position calculating circuit according to the first embodiment of this invention.

FIG. 9 is an illustrative view showing a predicted position calculation method executed in step S116 by the predicted position calculating circuit 1053 according to the first embodiment of this invention. As shown in FIG. 9, the predicted position calculating circuit 1053 defines a coordinate system XF_i–YF_i having the position of the host vehicle (the vehicle center of gravity of the host vehicle) in a current period i as the origin, the advancement direction of the host vehicle as the ordinate (where the advancement direction is positive), and the left-right direction of the host vehicle as the abscissa (where the rightward direction is positive).

When the obtained host vehicle velocity is set as V, the turning radius of the host vehicle is set as R, the center of the turning circle of the host vehicle is set as a point Op (R, 0), and the processing period is set as ΔT, the position of the host vehicle during the next period i+1 is a position shifted by an angle θ on a circle centering on the point Op and having the turning radius R. Here, θ is determined from Equation (11), shown below.

$$\theta = V \times \Delta T / R \qquad (11)$$

Further, as shown in FIG. 9, when the position of the target during the current period i is set as (X_i, Y_i), the ground velocity of the target is set as Vob, the curvature radius of the road shape in the target position is set as Rob, and the curvature center thereof is set as Oob (Cx, Cy), the position of the target during the next period i+1 is a position shifted by an angle θob on a circle centering on the point Oob and having the turning radius Rob. Here, θob is determined from Equation (12), shown below.

$$\theta ob = Vob \times \Delta T / Rob \qquad (12)$$

The predicted position calculating circuit 1053 then calculates the position (Xi_i+1, Yi_i+1) during the next period i+1, as seen on the coordinate system XF_i–YF_i, using Equations (13) and (14), shown below.

$$Xi\_i+1 = Rob \times \cos(\psi - \theta ob) + Cx \qquad (13)$$

$$Yi\_i+1 = Rob \times \sin(\psi - \theta ob) + Cy \qquad (14)$$

Next, the predicted position calculating circuit 1053 defines a coordinate system XF_i+1–YF_i+1 having the position of the host vehicle during the next period i+1 as the origin, the advancement direction of the host vehicle during the next period as the ordinate (where the advancement direction is positive), and the left-right direction of the host vehicle during the next period as the abscissa (where the rightward direction is positive).

At this time, the predicted position (Xp_i+1, Yp_i+1) during the next period on the coordinate system XF_i+1–YF_i+1 can be determined from Equation (15), shown below.

$$\begin{bmatrix} Xp\_i+1 \\ Yp\_i+1 \\ 1 \end{bmatrix} = \begin{bmatrix} \cos\theta & -\sin\theta & R \times (1-\cos\theta) \\ \sin\theta & \cos\theta & -R\sin\theta \\ 0 & 0 & 1 \end{bmatrix} \times \begin{bmatrix} Xi\_i+1 \\ Yi\_i+1 \\ 1 \end{bmatrix} \qquad (15)$$

Note that in the first embodiment, the prediction is implemented on the assumption that the curvature center of the movement of the host vehicle matches the curvature center of the movement of the target (i.e. on the assumption that Cx=R and Cy=0). Accordingly, the predicted position calculating circuit 1053 may calculate the predicted position using Equations (16) and (17), shown below, instead of Equation (15).

$$Xi\_i+1 = Rob \times \cos(\psi - \theta ob + \theta) + R \qquad (16)$$

$$Yi\_i+1 = Rob \times \sin(\psi - \theta ob + \theta) \qquad (17)$$

Next, returning to FIG. 8, after advancing to step S117, the predicted position calculating circuit 1053 calculates the predicted position (Xp_i+1, Yp_i+1) of the target during the next period from Equations (18) to (21), shown below, using the smoothed position of the target during the current period and the smoothed position of the target during the previous period. In other words, the predicted position calculating circuit 1053 calculates the predicted position using a differential value corresponding to the position difference.

$$Xp\_i+1 = X\_i + \Delta T \times (dXi/dt) \qquad (18)$$

$$Yp\_i+1 = Y\_i + \Delta T \times (dYi/dt) \qquad (19)$$

$$dXi/dt = (X\_i - X\_i-1)/\Delta T \qquad (20)$$

$$dYi/dt = (Y\_i - Y\_i-1)/\Delta T \qquad (21)$$

After advancing to step S118, on the other hand, the predicted position calculating circuit 1053 calculates the predicted position (Xp_i+1, Yp_i+1) of the target during the next period using the smoothed position (X_i, Y_i) of the target during the current period of the target, the host vehicle velocity V, and the turning radius R of the host vehicle.

In step S118, the predicted position calculating circuit 1053 calculates the predicted position in accordance with a case in which the target is determined to be stationary. Since the target has no velocity, the position (Xi_i+1, Yi_i+1) of the target during the next period i+1 as seen on the coordinate system XF_i–YF_i is equal to (X_i, Y_i).

The predicted position (Xp_i+1, Yp_i+1) during the next period on the coordinate system XF_i+1–YF_i+1 is determined in consideration of the movement of the host vehicle (the host vehicle velocity and the turning radius of the host vehicle) alone, as shown below in Equation (22).

$$\begin{bmatrix} Xp\_i+1 \\ Yp\_i+1 \\ 1 \end{bmatrix} = \begin{bmatrix} \cos\theta & -\sin\theta & R \times (1-\cos\theta) \\ \sin\theta & \cos\theta & -R\sin\theta \\ 0 & 0 & 1 \end{bmatrix} \times \begin{bmatrix} X\_i \\ Y\_i \\ 1 \end{bmatrix} \qquad (22)$$

By transforming Equation (22), the predicted position (Xp_i+1, Yp_i+1) can also be determined as shown below in Equations (23) and (24).

$$Xi\_i+1 = Rob \times \cos(\psi + \theta) + R \qquad (23)$$

$$Yi\_i+1 = Rob \times \sin(\psi + \theta) \qquad (24)$$

Hence, according to the first embodiment described above, the position of the peripheral target is predicted in consideration of the respective movement velocities of the host vehicle and the peripheral target and the road shapes along which the host vehicle and the peripheral target travel (the curvature centers and curvature radii of the movement thereof). As a result, the position of the target can be estimated precisely even when the host vehicle is on a curve.

This invention is not limited to the first embodiment, and may take various forms without departing from the technical scope of the invention. Examples of these various forms are cited below.

In the first embodiment, the estimation device receives the output of the periphery monitoring device 3 and estimates the predicted position. However, the estimation method implemented by the estimation device may be implemented in the interior of the periphery monitoring device 3.

Further, in the first embodiment, the periphery monitoring device 3 was described as an FMCW radar device. However, the periphery monitoring device 3 used in this invention is not limited thereto. The periphery monitoring device 3 may be any sensor capable of measuring the position and Doppler velocity of a peripheral target, for example a two-frequency CW radar device or an ultrasonic sensor.

Furthermore, as long as the periphery monitoring device 3 is capable of outputting the position and Doppler velocity of a peripheral target, the periphery monitoring device 3 may be a device that implements sensor fusion between a sensor such as a radar or ultrasonic sensor that is capable of measuring the position and Doppler velocity, and a camera or another sensor such as a Lidar sensor.

Further, in the first embodiment, a case in which the object recognizing circuit 303 employs a method of using the power of the target signal obtained from the FMCW radar was described. However, the object recognizing circuit 303 used in this invention is not limited thereto. For example, when an image can be obtained from a camera, object recognition may be performed by means of pattern recognition or the like. Furthermore, when the shape of the target can be measured using Lidar or the like, object recognition may be performed using shape information.

Moreover, in the first embodiment, a case in which the host vehicle turning radius obtaining circuit 102 calculates the turning radius of the host vehicle from the yaw rate and the vehicle velocity was described. However, this invention is not limited thereto, and the turning radius of the host vehicle may be calculated using the steering angle, a lateral acceleration sensor, or the like.

Furthermore, in the first embodiment, a case in which the target position road shape calculating circuit 103 calculates the road shape of the target from the position of the target and the turning radius of the host vehicle was described. However, when a camera is installed in the host vehicle 2 or a camera is included in the periphery monitoring device 3, and an image of the front of the host vehicle can be obtained from the camera, a lane may be detected by image processing, and the road shape in the target position may be determined from lane information on the image.

Furthermore, when the periphery monitoring device 3 is capable of detecting a plurality of peripheral targets, roadside objects such as a guardrail, a roadside tree, or the like may be extracted by the periphery monitoring device 3, and the road shape may be estimated from an arrangement of roadside objects in the vicinity of the target.

Moreover, when a GNSS such as GPS is installed in the host vehicle 2 and the GNSS includes map data representing geographical information that includes road shapes, the position of the target on the map may be determined by implementing map matching or the like using the position of the host vehicle on the map, the position of the target, and the map data, and the road shape in the position of the target on the map may be obtained from the map data.

Further, in the first embodiment, a case in which the vehicle determining circuit 108 determines whether or not the target is a vehicle using the category of the target, output by the object recognizing circuit 303, was described. However, this invention is not limited thereto, and the determination as to whether or not the target is a vehicle may be made from the ground velocity of the target, a movement locus of the object, which is determined from a tracking result, and so on.

Furthermore, in the first embodiment, a case in which the host vehicle lane vicinity determining circuit 109 determines whether or not the target is in the vicinity of the host vehicle lane from the turning radius R of the host vehicle, calculated by the host vehicle turning radius obtaining circuit 102, and the road shape in the target position, calculated by the target road shape calculating circuit, was described. However, when a camera is installed in the host vehicle 2 or a camera is included in the periphery monitoring device 3, and an image of the front of the host vehicle can be obtained from the camera, a white line may be detected from the image, and the determination as to whether or not the target is in the vicinity of the host vehicle lane may be made from a positional relationship between the target and the detected white line.

Additionally, in the first embodiment, a case in which the target course change determining circuit 110 determines whether or not the target is in the vicinity of the host vehicle lane from the turning radius R of the host vehicle, calculated by the host vehicle turning radius obtaining circuit 102, and the road shape in the target position, calculated by the target road shape calculating circuit, was described. However, when a camera is installed in the host vehicle 2 or a camera is included in the periphery monitoring device 3, and an image of the front of the host vehicle can be obtained from the camera, a white line may be detected from the image, and the determination as to whether or not the target is in the vicinity of the host vehicle lane may be made from a positional relationship between the target and the detected white line. A course change by the target may also be determined by determining whether or not an indicator lamp of the target is flashing.

Moreover, in the first embodiment, a case in which the position calculating circuit 1052 of the tracking circuit 105 implements tracking processing (smoothing processing) using Equations (1) and (2) while the predicted position calculating circuit 1053 of the tracking circuit 105 implements tracking processing (smoothing processing and prediction processing) using Equations (18) to (21) was described. However, the tracking processing may be implemented by replacing these formulae with formulae used by a well-known tracking filter such as an α-β filter or a Kalman filter.

What is claimed is:

1. A tracking device for detecting a smoothed position of an object existing on a periphery of a host vehicle, the tracking device comprising:
   a position calculating circuit that detects a position of the object;
   a Doppler velocity calculating circuit that obtains a measured Doppler velocity of the object from a first sensor or camera;
   a host vehicle velocity obtaining circuit that obtains a measured host vehicle velocity from a second sensor or camera;
   a host vehicle turning radius obtaining circuit that calculates a turning radius of the host vehicle based on information received from a third sensor, which is a steering angle or yaw rate sensor that detects a steering angle or yaw rate of the host vehicle;
   a predicted position calculating circuit that, while the host vehicle is performing a host vehicle turn, calculates the predicted position of the object along the host vehicle turn based on the detected position of the object, the measured Doppler velocity, the measured host vehicle velocity, and the calculated turning radius of the host vehicle; and
   a smoothed position calculating circuit that calculates the smoothed position of the object on the basis of an observed position of the object existing on the periphery of the host vehicle, which is to be detected or has been detected by a reflection wave, and the predicted position of the object.

2. The tracking device according to claim 1, wherein the predicted position calculating circuit:
   calculates a ground velocity of the object using a following equation:

$$Vob=(V\times\cos\phi)+Vdop/\cos(\xi)$$

where Vob is the ground velocity of the object, V is the host vehicle velocity, ϕ is a bearing direction angle of the object, Vdop is the Doppler velocity, and ξ is an angle formed by an advancement direction and a bearing direction of the object, and
   calculates the predicted position of the object using the calculated ground velocity of the object.

3. The tracking device according to claim 1, further comprising a target condition determining circuit for determining whether or not the object is stationary, wherein, when the object is stationary, the predicted position calculating circuit calculates the predicted position of the object along the host vehicle turn using the host vehicle velocity, the turning radius of the host vehicle, and the position of the object.

4. The tracking device according to claim 1, further comprising a host vehicle course change determining circuit for determining whether or not the host vehicle is changing course, wherein, when the host vehicle is determined to be changing course, the predicted position calculating circuit calculates the predicted position of the object in accordance with the position of the object and variation in the position of the object.

5. The tracking device according to claim 1, further comprising a vehicle determining circuit for determining whether or not the object is a vehicle, wherein, when the object is not a vehicle, the predicted position calculating circuit calculates the predicted position of the object in accordance with the position of the object and variation in the position of the object.

6. The tracking device according to claim 1, further comprising a host vehicle lane vicinity determining circuit for determining whether or not the object is positioned in a vicinity of a lane of the host vehicle, wherein, when the object is not positioned in the vicinity of the lane of the host vehicle, the predicted position calculating circuit calculates the predicted position of the object in accordance with the position of the object and variation in the position of the object.

7. The tracking device according to claim 1, further comprising a target course change determining circuit for determining whether or not the object is changing course, wherein, when the object is determined to be changing course, the predicted position calculating circuit calculates the predicted position of the object in accordance with the position of the object and variation in the position of the object.

8. The tracking device according to claim 1, wherein the predicted position calculating circuit detects a road shape in the position of the object on the basis of either image information relating to a road image captured by a camera installed in the host vehicle or map information registered in advance, and calculates the predicted position of the object on the basis of the detected road shape.

9. The tracking device according to claim 1, wherein the first sensor is a host vehicle velocity sensor, and the second sensor is one of a radar sensor or an ultrasonic sensor.

10. An tracking method for detecting a smoothed position of an object existing on a periphery of a host vehicle, the tracking method comprising:
  detecting a position of the object;
  obtaining a measured Doppler velocity of the object from the first sensor or camera;
  obtaining a measured host vehicle velocity from a second sensor or camera;
  calculating a turning radius of the host vehicle based on information received from a third sensor, which is a steering angle or yaw rate sensor that detects a steering angle or yaw rate of the host vehicle;
  calculating, while the host vehicle is performing a host vehicle turn, a predicted position of the object along the host vehicle turn based on the detected position of the object, the measured Doppler velocity, the measured host vehicle velocity, and the calculated turning radius of the host vehicle; and
  calculating the smoothed position of the object on the basis of an observed position of the object existing on the periphery of the host vehicle, which is to be detected or has been detected by a reflection wave, and the predicted position of the object.

11. The tracking method according to claim 10, wherein, in the calculating of the predicted position of the object along the host vehicle turn:
  a ground velocity of the object is calculated using a following equation:

$Vob = (V \times \cos\phi) + Vdop/\cos(\xi)$ where Vob is the ground velocity of the object, V is the host vehicle velocity, $\phi$ is a bearing direction angle of the object, Vdop is the Doppler velocity, and $\xi$ is an angle formed by an advancement direction and a bearing direction of the object, and
  the predicted position of the object is calculated using the calculated ground velocity of the object.

12. The tracking method according to claim 10, further comprising determining whether the object is stationary or moving, wherein, in the calculating of the predicted position of the object along the host vehicle turn, when the object is stationary, the predicted position of the object is calculated along the host vehicle turn using the host vehicle velocity, the turning radius of the host vehicle, and the position of the object.

13. The tracking method according to claim 10, further comprising determining whether or not the host vehicle is changing course, wherein, in the calculating of the predicted position of the object along the host vehicle turn, when the host vehicle is determined not to be changing course, the predicted position of the object is calculated in accordance with the position of the object and variation in the position of the object.

14. The tracking method according to claim 10, further comprising determining whether or not the object is a vehicle, wherein, in the calculating of the predicted position of the object along the host vehicle turn, when the object is not a vehicle, the predicted position of the object is calculated in accordance with the position of the object and variation in the position of the object.

15. The tracking method according to claim 10, further comprising determining whether or not the object is positioned in the vicinity of a lane of the host vehicle, wherein, in the calculating of the predicted position of the object along the host vehicle turn, when the object is not positioned in the vicinity of the lane of the host vehicle, the predicted position of the object is calculated in accordance with the position of the object and variation in the position of the object.

16. The tracking method according to claim 10, further comprising determining whether or not the object is changing course, wherein, in the calculating of the predicted position of the object along the host vehicle turn, when the object is determined to be changing course, the predicted position of the object is calculated in accordance with the position of the object and variation in the position of the object.

17. The tracking method according to claim 10, wherein, in the calculating of the predicted position of the object along the host vehicle turn, a road shape in the position of the object is detected on the basis of either image information relating to a road image captured by a camera installed in the host vehicle or map information registered in advance, and the predicted position of the object is calculated on the basis of the detected road shape.

18. A tracking device for detecting a smoothed position of an object existing on a periphery of a host vehicle, the tracking device comprising:
- a position calculating circuit that detects a position of the object;
- a Doppler velocity calculating circuit that obtains a measured Doppler velocity of the object from a first sensor or camera;
- a host vehicle velocity obtaining circuit that obtains a measured host vehicle velocity from a second sensor or camera;
- a host vehicle turning radius obtaining circuit that calculates a turning radius of the host vehicle based on information received from a third sensor, which is a steering angle or yaw rate sensor that detects a steering angle or yaw rate of the host vehicle;
- a predicted position calculating circuit that, while the host vehicle is performing a host vehicle turn, calculates the predicted position of the object along the host vehicle turn based on the detected position of the object, the measured Doppler velocity, the measured host vehicle velocity, and the calculated turning radius of the host vehicle; and
- a smoothed position calculating circuit that calculates the smoothed position of the object on the basis of an observed position of the object existing on the periphery of the host vehicle, which is to be detected or has been detected by a reflection wave, and the predicted position of the object, wherein the sensors include one or more of: a host vehicle velocity sensor, a yaw rate sensor, a steering angle sensor, a Lidar sensor, a radar sensor or an ultrasonic sensor.

* * * * *